United States Patent
Thorell et al.

(10) Patent No.: US 6,373,988 B1
(45) Date of Patent: Apr. 16, 2002

(54) LOSSLESS IMAGE COMPRESSION WITH TREE CODING

(75) Inventors: Per Thorell, Solna; Torbjörn Einarsson, Stockholm, both of (SE); Filippo Passaggio, Genova (IT)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/434,493

(22) Filed: Nov. 5, 1999

Related U.S. Application Data

(63) Continuation of application No. PCT/SE98/00839, filed on May 7, 1998.

(30) Foreign Application Priority Data

May 13, 1997 (SE) .............................................. 970168-5

(51) Int. Cl.⁷ .................................................. G06K 9/36
(52) U.S. Cl. ...................... 382/240; 358/426; 382/237
(58) Field of Search ................................ 382/240, 232, 382/237; 348/384.1; 358/426, 262.1, 470

(56) References Cited

U.S. PATENT DOCUMENTS

| 4,261,018 A | * | 4/1981 | Knowlton | 358/470 |
| 4,858,017 A | * | 8/1989 | Torbey | 358/426 |
| 5,392,133 A | * | 2/1995 | Nakajima | 358/407 |
| 5,442,458 A | * | 8/1995 | Rabbani et al. | 358/426 |
| 5,881,173 A | * | 3/1999 | Ohmori | 382/232 |
| 5,978,507 A | * | 11/1999 | Shackleton et al. | 382/195 |

FOREIGN PATENT DOCUMENTS

| EP | 0 701 375 A2 | 3/1996 |
| FR | 2 725 060 A1 | 3/1996 |

\* cited by examiner

*Primary Examiner*—Bhavesh Mehta
*Assistant Examiner*—Ali Bayat
(74) *Attorney, Agent, or Firm*—Nixon & Vanderhye P.C.

(57) ABSTRACT

In a method and a device for coding binary matrices, in particular sparse binary matrices, a matrix is gradually partitioned into sub-matrices During the gradual partitioning the number of binary ones are counted for each resulting sub-matrix. If a resulting sub-matrix does not consist of mixed symbols no further partitioning of that sub-matrix is required. The counted number of binary ones for each sub-matrix is then coded and transmitted. The method provides an efficient coding particularly for sparse binary matrices such as bi-level images or bit maps.

12 Claims, 3 Drawing Sheets

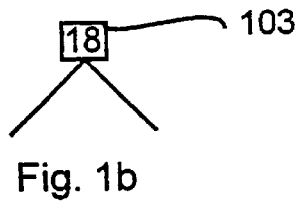
Fig. 1a
Fig. 1b
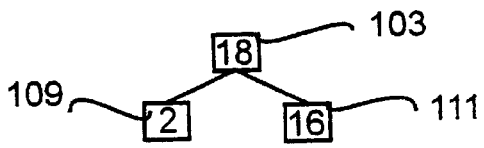
Fig. 1c
Fig. 1d
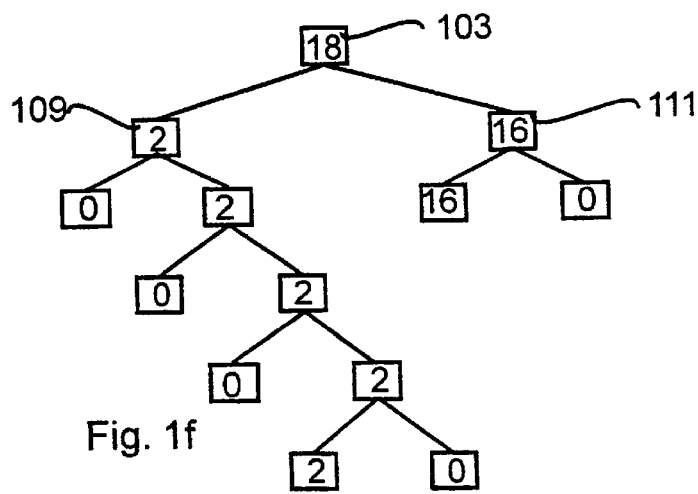
Fig. 1e
Fig. 1f

__US 6,373,988 B1__

LOSSLESS IMAGE COMPRESSION WITH TREE CODING

This is a continuation of PCT application No. PCT/SE98/00839, filed May 7, 1998, the entire content of which is hereby incorporated by reference in this application.

TECHNICAL FIELD

The present invention relates to a method and a device for image and video compression for efficient storage or transmission of images, in particular sparse bi-level images.

BACKGROUND OF THE INVENTION AND PRIOR ART

In recent years there has been an increased interest in video telephony and video conferences. One problem associated with video communication is that it normally requires a large amount of bandwidth. Although there has been a tremendous development in transmission technologies and bandwidth is getting cheaper there still exists a need to code the information in an efficient way, and thereby reduce the amount of bandwidth required. In the future, video compression is also likely to become very important in wireless multimedia communication systems, since the bandwidth of the radio frequency spectrum is a limited resource.

There are basically two different strategies that can be employed in order to compress data. The first strategy is to remove statistical redundancy. This is done by choosing a more efficient representation for the data. If there is no statistical redundancy in the data that can be removed and there still is a need for further compression, some of the information from the original data must be removed.

This latter technique is called lossy compression and is common in coding of audio and video, where features of sound and images that humans find less perceptible are removed. Most video compression techniques consist of a number of filtering and transformation steps that remove redundancy or unimportant details from the data.

In some applications it is desired to efficiently compress two-dimensional bitmaps. Such an application can, for example, be when transmitting bit plane coded images plane by plane. A bitmap of an entire bit plane or a part thereof must then be further processed in order to get a compact bitstream that can be transmitted or stored in an efficient way.

There exists a number of standard methods for compressing bi-level images, e.g. ITU-T G4, ISO JBIG and Quadtree coding.

Also, U.S. Pat. No. 4,261,018 describes a method for progressively transmitting a binary black and white image. The method divides such a binary image into smaller and smaller blocks until such a block is found to be consisting of only white or only black elements. When a certain size of small block is reached no further sub-division is performed, and the small blocks still comprising both white and black elements are coded.

The problem with the above methods is that they are not optimized, and therefore provide relatively poor results, for a number of different output patterns produced by a number of different algorithms, for example the algorithm described in our co-pending International patent application PCT/SE96/00943.

SUMMARY OF THE INVENTION

It is an object of the present invention to overcome the problems associated with the prior art and to increase the efficiency and performance in coding of bi-level images or matrices.

This object is obtained with a method and a device for coding binary matrices, in particular sparse binary matrices, a matrix is gradually partitioned into sub-matrices. During the gradual partitioning the number of binary ones are counted for each resulting sub-matrix. If a resulting sub-matrix does not consist of mixed symbols no further partitioning of that sub-matrix is required. The counted number of binary ones for each sub-matrix is then coded and transmitted.

Hence, for a bi-level image the method can comprise the following steps:

The bi-level image is first transformed into a labelled binary tree. The tree is then traversed and the values in the nodes are efficiently entropy coded with arithmetic coding. Each node in the binary tree obtained represents a specific area of the image. The values in the nodes contain the number of white pixels in the corresponding area of the image.

Thus, for a bi-level image, for example a bitmap where white pixels are coded with the binary symbol 1 and a black pixels with the binary symbol 0, a scheme can be designed in the following manner.

First, the number of binary ones in the bitmap are counted and the resulting number is placed in the root node of a binary tree.

The bitmap is then divided into two parts and the number of binary ones in each of the two parts is counted. The sum of the two numbers thus obtained will be equal to the number in the previous root node.

The binary tree is then extended by placing these two numbers as leaves to the root node.

Each sub-image obtained in this manner, which is not completely filled with either binary ones or zeros, is then divided again and the above steps are performed again.

Finally, when all sub-images of the original bitmap only consist of either only black or white pixels, the binary tree representing such a division is coded.

Such coding can for example be performed by means of entropy coding the sum in the root node, and then entropy coding the leaves of the node. This is preferably done using arithmetic coding. Since the sum of the two leaves is known from their node only one of the two leaves needs to be coded. The input to the arithmetic coder is the symbol denoting the number and a distribution function suitable for the type of image to be coded.

The way of dividing the bitmap is preferably predefined and known both by the coder and the decoder. Since the partitioning in such a case is coded implicitly, no information regarding the partitioning needs to be transmitted to the decoder.

This way of coding bi-level images has been found to provide very good results in terms of compression ratio. It has also been found to be particularly suited for coding bi-level images where the number of whites or blacks are known to be very dominant, so called sparse bi-level images.

BRIEF DESCRIPTION OF THE DRAWINGS

The present invention will now be described in more detail by way of non-limiting examples, and with reference to the accompanying drawings, in which:

FIGS. 1a–1f illustrate different steps carried out when representing and coding a bi-level image.

DESCRIPTION OF A PREFERRED EMBODIMENT

Figure 2:
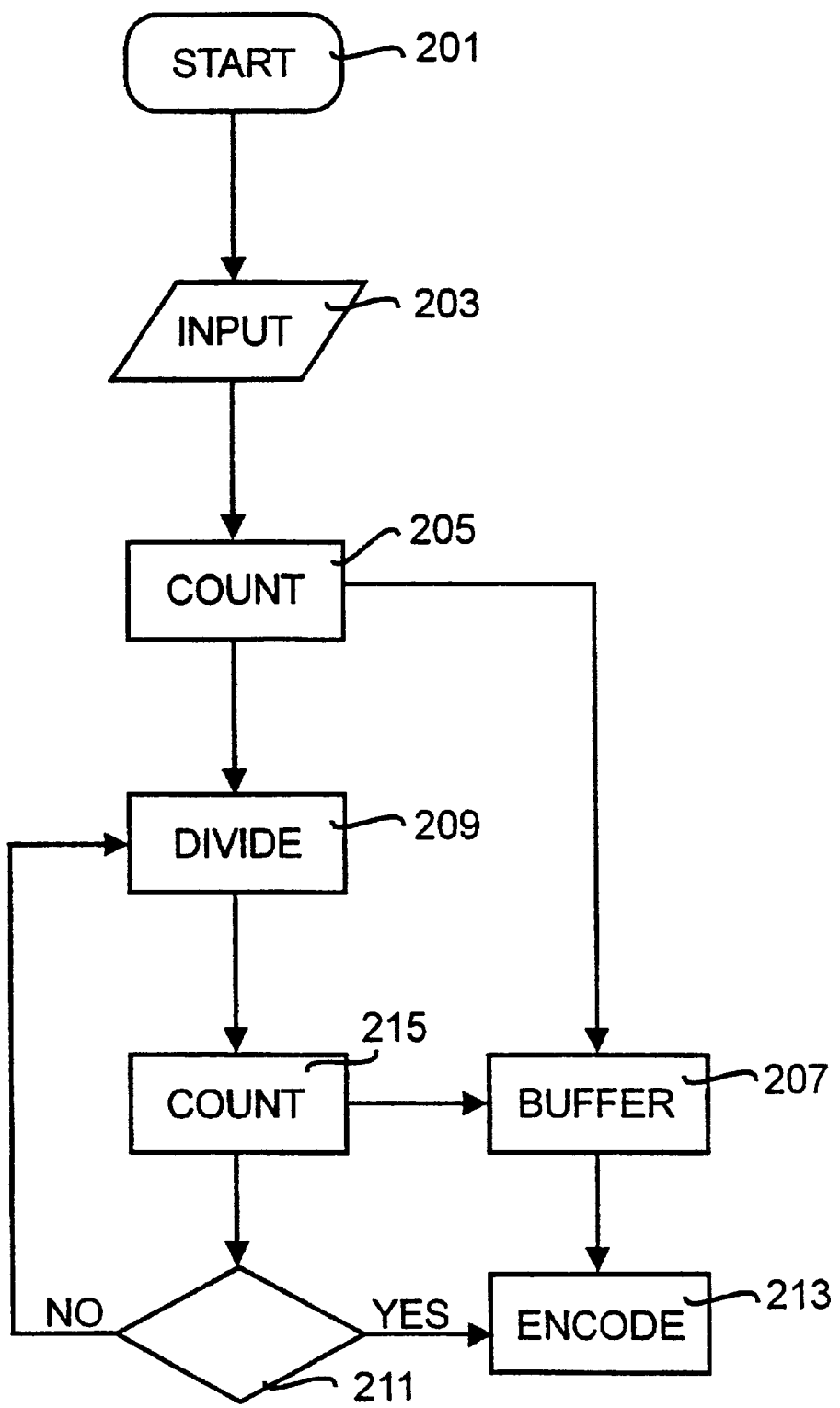
FIG. 2 is a flow chart for coding bi-level images.

In FIGS. 1a–1f different steps of coding a bi-level image are shown. Thus, in FIG. 1a a bi-level image 101 consisting of binary ones and zeroes, which is to be coded, is shown. A coding is then performed in order to minimize information needed for transmitting or storing the image, and which is carried out as follows.

First the number of binary ones (or zeroes) of the binary image is counted. In this example the number of binary ones is counted and found to be eighteen. This number is stored and placed as the root node 103 in a binary tree, see FIG. 1b.

Thereafter, the original binary image 101 is divided into two. In this example a division into sub-images is performed in the middle alternately horizontally and vertically. However, other methods of dividing the image are of course possible. It is also preferred that the scheme according to which the division is performed is predetermined, so that no information regarding the division scheme need to be transmitted from an encoder using the coding algorithm to an intended decoder.

Thus, as is shown in FIG. 1c, the original binary image 101 is divided by means of a horizontal division along the middle thereof. The number of binary ones in the obtained sub-images are then counted and found to be two in the upper sub-image 105 and sixteen in the lower sub-image 107. These two values obtained in this manner are then placed as leaves 109 and 111, respectively to the root node, see FIG. 1d.

Each sub-image is then divided into two new sub-images, this time by means of a vertical division. The alternating division of the sub-images is continued until such a sub-image consists proof either only binary ones or binary zeroes. The result of such a division is shown in FIG. 1e.

After each sub-division the number of ones in each of the two obtained sub-images are placed as leaves of the node corresponding to sub-image that is divided. The resulting binary tree from such an operation corresponding to the division performed in this example and shown in FIG. 1e, is shown in FIG. 1f.

Hence, the binary tree as shown in FIG. 1f, in combination with the information that sub-images are obtained using alternatingly horizontal and vertical division, starting with a horizontal division, is a unique representation of the original image shown in FIG. 1a.

The major advantage of forming the binary tree in the above manner is that it requires a small amount of data to be coded for storage and transmission purposes.

The information needed to be coded is first of all the root node. Then only one of the two leaves of the root node has to be coded, since the other one is given implicitly by the fact that the sum of the two leaves is equal to the root node. This is the case for all pairs of leaves resulting from a node.

It should also be noted that, since the maximal number being possible for one leaf is limited to its node, the number of symbols required for coding a particular leaf relatively quickly becomes small. The coding for each leaf can therefore be made very efficient.

This information is fed to an encoder, possibly also together with information regarding a probability function or probability model, which codes the binary tree in an efficient manner. The coding is preferably performed using an arithmetic entropy coder. The entropy coder can for example be the Syntax-based Arithmetic Coding mode (SAC) encoder described in the annex E of the H. 263 standard.

In FIG. 2 a schematic flow chart for implementing the algorithm is shown. The processing starts in a block 201. Then a binary bi-level image to be transmitted or stored is input in a block 203, and the number of binary ones in that image are counted in a block 205. This number is stored in a buffer 207. Thereafter the binary image is divided into two sub-images in a block 209. The number of binary ones in each sub-image is then counted in a block 215 and fed to the buffer 207.

Thereupon the process proceeds to a block 211 where it is checked if all sub-images consist only of binary ones or binary zeroes. If this is the case the process proceeds to the block 213, where the information is fetched which is stored in the buffer and it is encoded.

On the other hand, if there still are sub-images consisting of a mix of binary ones and zeroes these sub-images are returned to the block 209. Thus, a recursive division of the input image is performed until it consists of sub-images having only binary ones or zeroes.

The steps above describes the general idea of the algorithm. When the algorithm is implemented in software or hardware, it can be better to form the binary tree using a bottom up method instead of a top down method. Moreover, the probability estimation function fed to the encoder should also be optimised to the characteristics of the input images.

Figure 3:
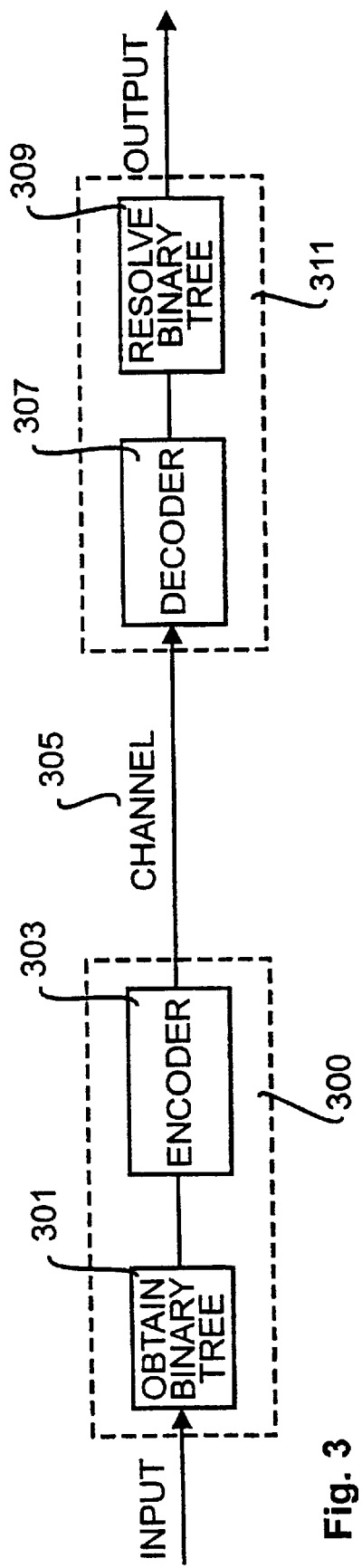
FIG. 3 is a schematic view of a transmission system for bi-level images.

In FIG. 3 a schematic view of a transmission system using the algorithm having a transmitter 300 and a receiver 311 is shown. Thus, a binary bi-level image is input into the transmitter 300 in a block 301. In the block 301 the binary image is transformed into a corresponding binary tree, for example as described above in conjunction with the FIGS. 1 and 2. The binary tree representation is then fed to an encoder 303. The encoder 303 can for example be the SAC encoder referred to above.

Thereupon, the information is transmitted on a channel 305 from the transmitter 300 to the intended receiver 311. The receiver 311 decodes the received information in a block 307 using a decoding algorithm corresponding to the coding algorithm used. The decoded information representing the transmitted binary tree is then fed to a block 309 in which the binary tree is transformed into its corresponding binary image. The binary image is then output from the block 309.

Also, the method can also be used for coding any binary matrix of arbitrary order, i.e. having a dimension higher than two. Thus, for example, the method can be used for coding any binary grey-scale image. The partitioning is then extended to include the third dimension.

For example, a grey scale bit-plane represented image, formed by a number of pixels, can be regarded as a three dimensional matrix, having a length along an x-axis, a height along a y-axis and a depth along a z-axis. The partitioning and generation of sub-images or sub-matrices is then performed in a manner corresponding to the method described above.

Hence, first the three dimensional matrix is cut along one of the axis, e.g. the x-axis, then along another axis, e.g. the y-axis and then along the third axis, e.g. the z-axis. Thereafter the partitioning can return to cut along the first axis, etc.

The algorithm as described herein works very well for coding bi-level images, in particular sparse bi-level images, for example resulting from the algorithm described in our co-pending international patent application PCT/SE96/00943.

The algorithm is very flexible and by changing the equations for the probability estimation used, it is possible to tune it for a number of different applications. Such applications could be:

Coding facsimile messages or other bi-level images.

Coding shapes and objects in video sequences.

What is claimed is:

1. A method of coding a digitized bi-level image, the method comprising:
   a) counting the number of symbols corresponding to one level in the image,
   b) dividing the image into two sub-images,
   c) counting the number of symbols corresponding to one level in each of the sub-images,
   d) always repeating the steps b)–c) for each sub-image including mixed symbols, until the image always includes sub-images only consisting of symbols corresponding to one level, and
   e) coding the numbers obtained in the sub-steps a) and c).

2. A method according to claim 1, characterized in that the division is performed alternatively horizontally and vertically along the middle of the image and the sub-images.

3. A method according to claim 2, characterized in that the coding is performed using arithmetic coding.

4. A method of coding a bit-plane represented digitized grey scale image, the method comprising:
   a) for each bit-plane counting the number of symbols corresponding to one level in the bit-plane,
   b) dividing each of the bit-planes into two sub-bit-planes,
   c) counting the number of symbols corresponding to one level in each of the sub-bit-planes,
   d) always repeating the steps b)–c) for each sub-bit-plane including mixed symbols, until each bit-plane includes sub-bit-planes only consisting of symbols corresponding to one level, and
   e) following step d) and after all bit planes include sub-bit-planes only consisting of symbols corresponding to one level, coding numbers obtained in the sub-steps a) and c).

5. A method of compressing a binary matrix having a dimension n, n being a positive integer, the method comprising:
   a) counting the number of symbols corresponding to one level in the matrix,
   b) dividing the matrix into two sub-matrices,
   c) counting the number of symbols corresponding to one level in each of the sub-matrices,
   d) always repeating the steps b)–c) for each sub-matrix including mixed symbols, until the matrix always includes sub-matrices only consisting of symbols corresponding to one level and never includes sub-matrices including symbols corresponding to more than one level, and
   e) after the matrix includes only sub-matrices consisting of symbols corresponding only to one level, coding values obtained in the sub-steps a) and c).

6. A device for coding a digitized bi-level image comprising means for coding an output stream of digitized numbers, the device comprising:
   means for counting the number of symbols corresponding to one level in the image,
   means for dividing the image into two sub-images,
   means for counting the number of symbols corresponding to one level in each of the sub-images,
   control means connected to the dividing means and to the counting means arranged to always repeat the dividing and counting for each sub-image consisting of mixed symbols, until the image always consists of sub-images only consisting of symbols corresponding to one level, and
   means for feeding numbers corresponding to the one level sub-images to the coding means after the image consists only of sub-images corresponding to only one level.

7. A device according to claim 6, characterized in that the dividing means are arranged to perform the division alternatively horizontally and vertically along the middle of the image and the sub-images.

8. A device according to claim 6, characterized in that the coding means used is an arithmetic encoder.

9. A device for coding a bit-plane represented digitized grey scale image, the device comprising:
   means for counting the number of symbols corresponding to one level in a bit-plane for each bit-plane,
   means for dividing each bit-plane into two sub-bit-planes,
   means for counting the number of symbols corresponding to one level in each of the sub-bit-planes,
   control means connected to the dividing means and to the counting means arranged to always repeat the dividing of each bit-plane into two sub-bit-planes and the counting of the number of symbols corresponding to one level in each of the sub-bit-planes when a sub-bit-plane includes mixed symbols, until the bit-plane includes sub-bit-planes only consisting of symbols corresponding to one level, and means connected to the counting means for coding the numbers obtained.

10. A device for compressing a binary matrix having a dimension n, n being a positive integer, the device comprising:
    means for counting the number of symbols corresponding to one level in the matrix,
    means for dividing the matrix into two sub-matrices,
    means for counting the number of symbols corresponding to one level in each of the sub-matrices,
    control means connected to the dividing means and to the counting means arranged to always repeat the dividing of the matrix into two sub-matrices and the counting of the number of symbols corresponding to one level in each of the sub-matrices when a sub-matrix includes mixed symbols, until the matrix includes sub-matrices only consisting of symbols corresponding to one level, and means connected to the counting means for coding the numbers obtained.

11. A system comprising a transmitter and a receiver for transmission of a binary matrix having a dimension n, n being a positive integer, the system comprising:
    means in the transmitter for counting the number of symbols corresponding to one level in the matrix,
    means in the transmitter for dividing the matrix into two sub-matrices, means in the transmitter for counting the number of symbols corresponding to one level in each of the sub-matrices,
    control means in the transmitter connected to the dividing means and to the counting means arranged to always repeat the dividing of the matrix into two sub-matrices and the counting of the number of symbols corresponding to one level in each of the sub-matrices for each sub-matrix including mixed symbols, until the matrix includes sub-matrices only consisting of symbols corresponding to one level, means in the transmitter connected to the counting means for coding the numbers obtained, and
    corresponding means in the receiver for decoding the coded numbers.

12. A system according to claim 11, characterized in that the coding means used is an arithmetic encoder.

* * * * *

UNITED STATES PATENT AND TRADEMARK OFFICE
CERTIFICATE OF CORRECTION

PATENT NO. : 6,373,988 B1
DATED : April 16, 2002
INVENTOR(S) : Thorell et al.

It is certified that error appears in the above-identified patent and that said Letters Patent is hereby corrected as shown below:

<u>Title page,</u>
Item [30], Foreign Application Priority Data

The foreign application No. is incorrect as shown on the Letters Patent. Should be as shown below:

-- May 13, 1997        (SE)        9701768-5 --

Signed and Sealed this

Twenty-sixth Day of November, 2002

*Attest:*

*Attesting Officer*

JAMES E. ROGAN
*Director of the United States Patent and Trademark Office*